(12) United States Patent
Chung (10) Patent No.: US 9,484,731 B2
(45) Date of Patent: Nov. 1, 2016

(54) BIPOLAR LIGHTNING ROD APPARATUS

(71) Applicant: THE KOREA DEVELOPMENT BANK, Seoul (KR)

(72) Inventor: Young-Ki Chung, Seoul (KR)

(73) Assignee: THE KOREA DEVELOPMENT BANK, Seoul (KR)

( * ) Notice: Subject to any disclaimer, the term of this patent is extended or adjusted under 35 U.S.C. 154(b) by 134 days.

(21) Appl. No.: 14/143,280

(22) Filed: Dec. 30, 2013

(65) Prior Publication Data
US 2015/0122527 A1 May 7, 2015

(30) Foreign Application Priority Data
Nov. 7, 2013 (KR) .................. 10-2013-0134678

(51) Int. Cl.
*H02G 13/00* (2006.01)
(52) U.S. Cl.
CPC .................. *H02G 13/00* (2013.01)
(58) Field of Classification Search
CPC ...... H02G 13/00; H02G 13/40; H02G 13/80; H02G 7/00; H02G 1/02; H01B 17/42; H01B 17/00
USPC ........... 174/2, 3, 5 R, 5 SB, 5 SG, 6, 7, 4 R; 361/117
See application file for complete search history.

(56) References Cited

U.S. PATENT DOCUMENTS

| | | | | |
|---|---|---|---|---|
| 1,633,098 A * | 6/1927 | Heese | ............ | H02G 13/00 174/2 |
| 3,350,496 A * | 10/1967 | Ritter | ............ | H02G 13/00 174/4 C |
| 3,469,146 A * | 9/1969 | Harder | ............ | 361/117 |
| 5,661,262 A * | 8/1997 | Wilk | ............ | 174/2 |
| 6,320,119 B1 * | 11/2001 | Gumley | ............ | 174/3 |
| 2004/0105211 A1 * | 6/2004 | Chung | ............ | 361/220 |
| 2005/0061525 A1 * | 3/2005 | Chung | ............ | 174/3 |
| 2008/0310071 A1 * | 12/2008 | Jeon | ............ | H02G 7/056 361/117 |

FOREIGN PATENT DOCUMENTS

KR 101025499 4/2011

* cited by examiner

*Primary Examiner* — Jenny L Wagner
*Assistant Examiner* — Pete Lee
(74) *Attorney, Agent, or Firm* — Ballard Spahr LLP (57) ABSTRACT

A bipolar lightning rod apparatus includes a fixation plate, a rod member configured to have one end connected to the fixation plate in a length direction thereof and charged with the electric charges of a ground, at least two insulators installed in the length direction, an electrification plate installed between adjacent insulators, electrically insulated from the rod member, and charged with electric charges having an opposite polarity to the electric charges of the ground, an electrification tube installed between the electrification plate and the insulators, electrically connected to the electrification plate, and charged with electric charges having an opposite polarity to the electric charges of the ground, and a rod cap connected to the top of the rod member and configured to induce the falling of a thunderbolt. The rod cap has an outside diameter greater than that of the insulators.

1 Claim, 6 Drawing Sheets

BIPOLAR LIGHTNING ROD APPARATUS

CROSS REFERENCE TO RELATED APPLICATION

The present application claims the benefit of Korean Patent Application No. 10-2013-0134678 filed in the Korean Intellectual Property Office on Nov. 7, 2013, the entire contents of which are incorporated herein by reference.

BACKGROUND OF THE INVENTION

1. Technical Field

The present invention relates to a bipolar lightning rod apparatus and, more particularly, to a bipolar lightning rod apparatus capable of increasing discharge efficiency for a lightning current of the falling of a thunderbolt and also preventing the coupling and fixation power of the bipolar lightning rod apparatus from becoming weak due to vibration attributable to external environment factors, such as an earthquake or a typhoon.

2. Description of the Related Art

In general, a lightning rod apparatus is installed on top of a building in order to safely discharge electric charges, accumulated in thunderclouds, to the ground by forming a discharge path between the thunderclouds and the ground.

When a thundercloud approaches the ground, a potential between the thundercloud and the ground reaches one hundred million voltages (V).

An insulating breakdown, that is, the falling of a thunderbolt is rarely generated between the ground and a thundercloud because the air of the atmospheric layer serves as an excellent insulator, but there is always a possibility that the falling of a thunderbolt may occur between the thundercloud and the ground.

In order to prevent damage attributable to the falling of a thunderbolt, a lightning rod apparatus using an electric field phenomenon (i.e., tip effect) in which an electric field is concentrated on a pointed head has been known. Such a lightning rod apparatus is called a Franklin null method.

A conventional lightning rod apparatus is described below with reference to FIG. 1.

Figure 1:
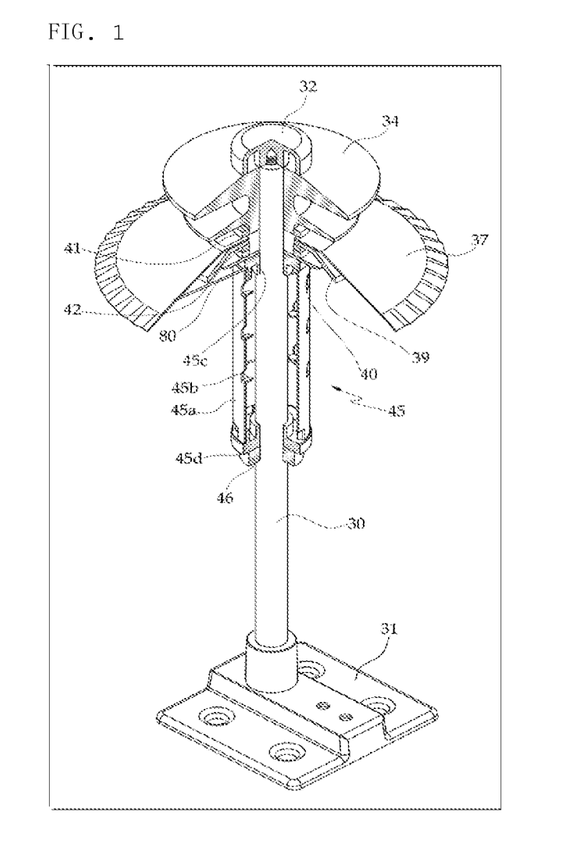
FIG. 1 is a partially cross-sectional view and perspective view showing the construction of a conventional lightning rod apparatus.

As shown in FIG. 1, the conventional lightning rod apparatus includes a fixation unit 31 installed on top of a building and connected to ground means, a rod 30 configured to have one end fixed to the fixation unit 31 and charged with the electric charges of the ground, a rod cap 32 connected with the other end of the rod 30 and induce the falling of a thunderbolt, an insulator 34 connected to the other end of the rod 30, and electrification means 45 mounted on the rod 30. The rod 30 is placed at the center of an electrification tube 45a.

The electrification means 45 includes an electrification tube 45a configured to have a tubular form, have the rod 30 penetrate the center of the electrification tube 45a, and have needle-shaped tips 45b formed therein and directed toward the rod 30 and a first cap 45c and a second cap 45d configured to combine both ends of the electrification tube 45a with the rod 30. The second cap 45d is closely adhered and fixed toward the insulator 34 by means of a stopper 46.

The conventional lightning rod apparatus, however, is problematic in that discharge efficiency is low because the time taken to discharge a lightning current is long due to the rod cap 32 having a relatively very smaller discharge area than the insulator 34.

Furthermore, the conventional lightning rod apparatus is problematic in that coherence between the rod 30 and the rod cap 32 is weak against vibration attributable to external environment factors, such as an earthquake or a typhoon, and coherence between the rod 30 and the fixation unit 31 is also weak because the rod 30 and the rod cap 32 have a coupling structure using a screw-mating method.

PRIOR ART DOCUMENT

Patent Document (Patent Document 1) Korean Patent Registration No. 1025499 (Mar. 22, 2011)

SUMMARY OF THE INVENTION

Accordingly, the present invention has been made keeping in mind the above problems occurring in the prior art, and an object of the present invention is to provide a bipolar lightning rod apparatus capable of increasing discharge efficiency for a lightning current of the falling of a thunderbolt and also preventing the coupling and fixation power of the bipolar lightning rod apparatus from becoming weak due to vibration attributable to external environment factors, such as an earthquake or a typhoon.

A bipolar lightning rod apparatus in accordance with the present invention includes a fixation plate; a rod member configured to have one end connected to the fixation plate in the length direction of the rod member and charged with the electric charges of a ground; at least two insulators installed in the length direction of the rod member; an electrification plate installed between adjacent insulators, electrically insulated from the rod member, and charged with electric charges having an opposite polarity to the electric charges of the ground; an electrification tube installed between the electrification plate and the insulators, electrically connected to the electrification plate, and charged with electric charges having an opposite polarity to the electric charges of the ground; and a rod cap connected to the top of the rod member and configured to induce a falling of a thunderbolt, wherein the rod cap is configured to have an outside diameter relatively greater than an outer diameter of the insulators so that discharge efficiency is increased by greatly increasing an area into which the falling of a thunderbolt is induced.

The rod cap includes a first cap of a dome shape; a second cap coupled to the outer circumference of the first cap in the radius direction of the first cap and a coupling member configured to couple the first cap to the rod member.

The coupling member includes a base plate configured to have a coupling hole formed therein and a coupling tool coupled to the coupling hole of the base plate. A multi-staged fitting jaw is formed in the outer circumference direction and in the length direction of the coupling tool. A coupling plate having fitting pieces, configured to receive the coupling tool and to be coupled correspondingly to the multi-staged fitting jaw, is formed within the first cap.

Saw-toothed needle electrodes each having a front end pointedly protruded from the saw-toothed needle electrode are formed at the other end of the coupling plate. The needle electrodes may be placed within the circumferential radius of the first cap or configured to protrude outside the circumferential radius of the first cap.

The insulators include a first insulator installed on the upper side of the electrification tube and a second insulator installed on the lower side of the electrification tube. Insulating protrusions inserted into the electrification tube are formed on top of the second insulator.

The second cap is formed to be greater than the outside diameter of the first insulator.

The bipolar lightning rod apparatus further includes grooves formed on the upper side of the electrification tube in the length direction of the electrification tube and a through groove formed on the lower side of the electrification tube in the length direction of the electrification tube.

The bipolar lightning rod apparatus further includes binding means for stable binding between the fixation plate and the rod member.

The fixation plate and the rod member are coupled by a coupling tool protruded from the fixation plate. The binding means includes a wire configured to have one end inserted into the support that is disposed on one side of the rod member in the length direction of the rod member and spirally wound in the length direction of the rod member, a fastening bolt configured to have a through groove through which the other end of the wire penetrates formed at the side of a head of the fastening bolt and inserted into the side of the coupling tool, and a stopper member installed at the other end of the wire and configured to prevent the wire from being separated from the fastening bolt.

<Description of reference numerals of principal elements in the drawings>

| | |
|---|---|
| 100: fixation plate | 200: rod member |
| 300: insulator | 310: first insulator |
| 320: second insulator | 600: rod cap |
| 400: electrification plate | |
| 500: electrification tube | |
| 610: first cap | 620: second cap |
| 630: coupling member | 700: binding means |

DETAILED DESCRIPTION

An exemplary embodiment of the present invention is described in detail with reference to FIGS. 2 to 6.

Figure 2:
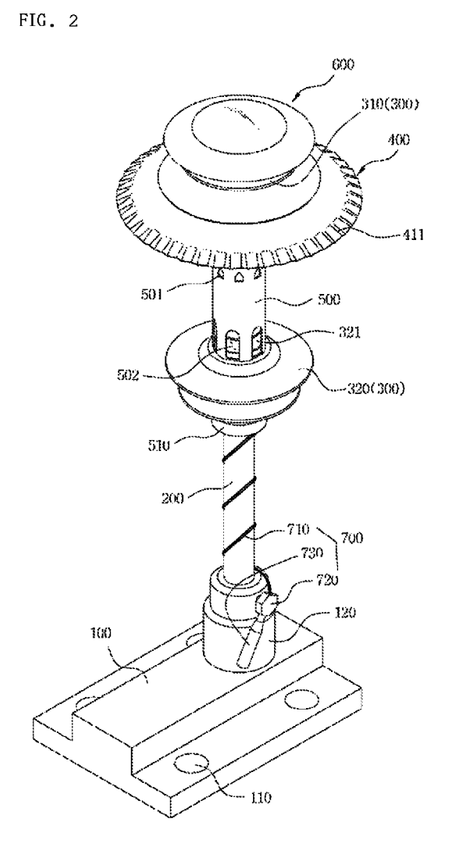
FIG. 2 is a perspective view showing a bipolar lightning rod apparatus in accordance with an embodiment of the present invention.
Figure 3:
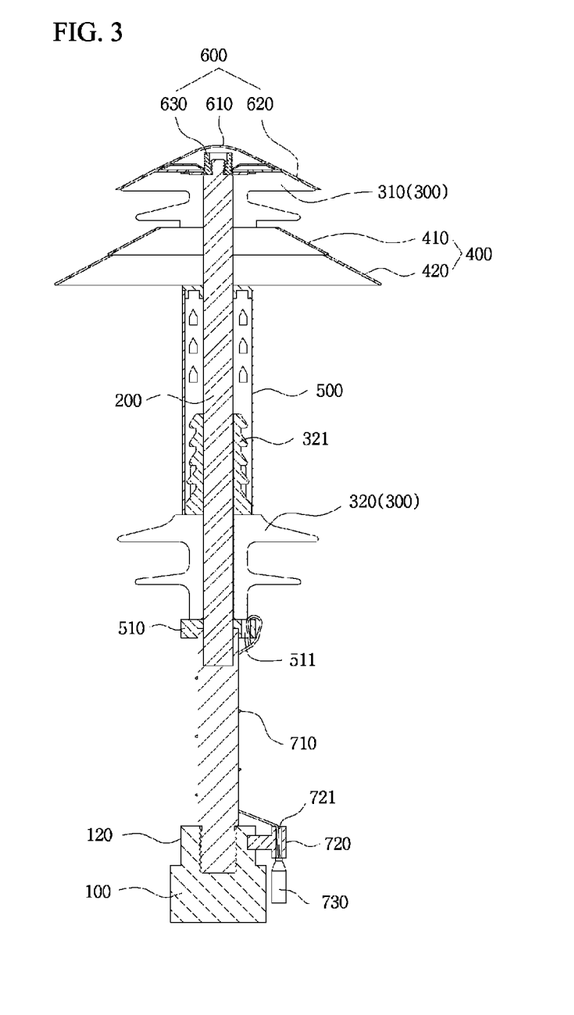
FIG. 3 is a cross-sectional view of the bipolar lightning rod apparatus of FIG. 2.

A bipolar lightning rod apparatus in accordance with an embodiment of the present invention is configured to include a fixation plate 100, a rod member 200 configured to have one end connected to the fixation plate 100 in its length direction and charged with the electric charges of the ground, at least two insulators 300 installed in the length direction of the rod member 200, an electrification plate 400 installed between adjacent insulators 300, electrically insulated from the rod member 200, and charged with electric charges having an opposite polarity to the electric charges of the ground, an electrification tube 500 installed between the electrification plate 400 and the insulators 300, electrically connected to the electrification plate 400, and charged with electric charges having an opposite polarity to the electric charges of the ground, and a rod cap 600 connected to the top of the rod member 200 and configured to induce the falling of a thunderbolt.

The fixation plate 100, the rod member 200, and the rod cap 600 in accordance with the present invention are connection elements which can be electrified together, and the electrification plate 400 is a connection element which is electrified with the electrification tube 500.

First, the fixation plate 100 is installed at an outdoor top floor and connected to a ground body. The fixation plate 100 functions to stably fix the rod member 200.

The fixation plate 100 is a flat panel-type member having a specific thickness. A plurality of coupling holes 110 formed to enable the fixation plate 100 to be firmly fixed to the ground or a building structure is formed in a surface of the fixation plate 100. A coupling tool 120 to be coupled to the rod member 200 by a screw is protruded from the fixation plate 100.

The rod member 200 has one end coupled to the coupling tool 120 of the fixation plate 100 in its length direction and thus vertically stands up. The rod member 200 functions to charge the electric charges of the ground.

Furthermore, the at least two insulators 300 are spaced apart from each other in the length direction of the rod member 200 and made of ceramics or synthetic resin. The insulators 300 insulate the rod member 200 and the electrification tube 500.

The insulators 300 include a first insulator 310 installed on the upper side of the electrification tube 500 and a second insulator 320 installed on the lower side of the electrification tube 500. Insulating protrusions 321 inserted into the electrification tube 500 are formed at the top of the second insulator 320.

The insulating protrusions 321 has a specific length such that it can provide guidance to rainwater introduced into the electrification tube 500 because of the influence of the wind in order for the rainwater to be easily discharged to the outside of the electrification rod 500 and that a sufficient insulating distance between the electrification tube 500 and the rod member 200 can be secured.

The insulating protrusions 321 has a structure in which a plurality of conical members each having a narrow upper part and a wide lower part is continuously coupled on the same line.

The electrification plate 400 includes circular first and second electrification plates 410 and 420 installed between the insulators 300, configured to maintain an electrical insulation state with the rod member 200, electrically connected to the electrification tube 500, and charged with electric charges having an opposite polarity to the electric charges of the ground.

Furthermore, the first and the second electrification plates 410 and 420 may be repeatedly formed in the form of wrinkles 411 at their edge in a cylindrical direction.

This is because the wrinkles 411 can function to derive uniform distribution discharge in the cylindrical direction of the first and the second electrification plates 410 and 420.

The first and the second electrification plates 410 and 420 facilitate discharge between a thundercloud and the ground by concentrating an electric field when the falling of a thunderbolt is introduced into the bipolar lightning rod apparatus.

The electrification tube 500 is installed between the electrification plate 400 and the insulators 300, electrically connected to the electrification plate 400, and charged with electric charges having an opposite polarity to the electric charges of the ground.

The electrification tube 500 is configured in a tubular form and is coupled to the rod member 200 in the state in which the rod member 200 penetrates the center of the electrification tube 500.

A support 510 for supporting the electrification tube 500 and the second insulator 320 is installed in the rod member 200.

Furthermore, an insertion hole 511 into which the wire 710 of binding means 700 is inserted is formed in the support 510.

Furthermore, grooves 501 are formed on the upper side of the electrification tube 500 in the length direction of the electrification tube 500, and through grooves 502 are formed on the lower side of the electrification tube 500 in the length direction thereof.

The rod cap 600 is installed at the top of the rod member 200 and configured to induce the falling of a thunderbolt.

Figure 4:
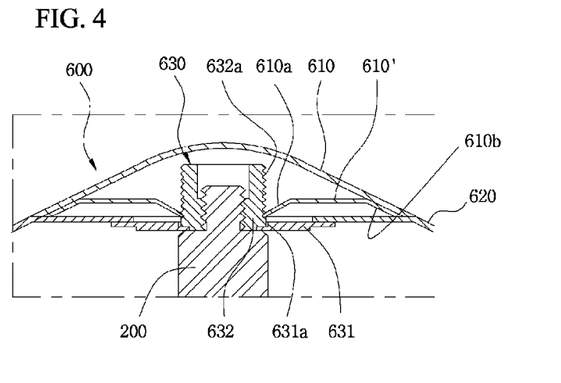
FIG. 4 is a partially enlarged view showing the construction of a rod cap shown in FIG. 3.

More particularly, the rod cap 600 includes a first cap 610 of a dome shape, a second cap 620 coupled to the outer circumference of the first cap 610 in the radius direction of the first cap 610, and a coupling member 630 configured to couple the first cap 610 to the rod member 200.

The coupling member 630 includes a base plate 631 configured to have a coupling hole 631*a* formed therein and a coupling tool 632 coupled to the coupling hole 631*a* of the base plate 631. A multi-staged fitting jaw 632*a* is formed in the outer circumference direction and in the length direction of the coupling tool 632. A coupling plate 610' having fitting pieces 610*a*, configured to receive the coupling tool 632 and to be coupled correspondingly to the multi-staged fitting jaw 632*a*, is formed within the first cap 610.

That is, the first cap 610 of the rod cap 600 and the coupling tool 632 are configured to have a press type coupling structure in which the first cap 610 and the coupling tool 632 are coupled up and down not using a screw-mating method. Accordingly, there is an advantage in that coherence between the first cap 610 and the coupling tool 632 can be prevented from becoming weak because the first cap 610 is prevented from being separated from the coupling tool 632 although the first cap 610 is rotated by vibration factors, such as an earthquake and a typhoon.

Furthermore, saw-toothed needle electrodes 610*b* each having a front end pointedly protruded therefrom are formed at the other end of the coupling plate 610'.

The needle electrode 610*b* functions to facilitate the start of discharge with a thundercloud by concentrating an electric field.

Figure 6:
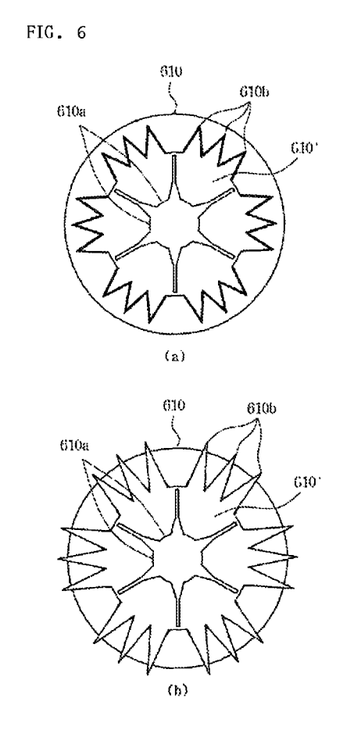
FIG. 6 is a bottom view showing the shape and construction of a coupling plate shown in FIG. 4.

Furthermore, the needle electrodes 610*b* may be placed within the circumferential radius of the first cap 610 or may be configured to protrude outside the circumferential radius of the first cap 610 (refer to FIG. 6).

The rod cap 600 is configured to have a relatively larger outside diameter than the insulator 300 in order to improve discharge efficiency by increasing an area into which the falling of a thunderbolt is introduced (i.e., discharge with a thundercloud). That is, the second cap 620 has a greater outside diameter than the first insulator 310.

Since the rod cap 600 is formed to be greater than the first insulator 310 as described above, the falling of a thunderbolt can be rapidly discharged because an area for inducing a lightning current of the falling of a thunderbolt is increased.

Figure 5:
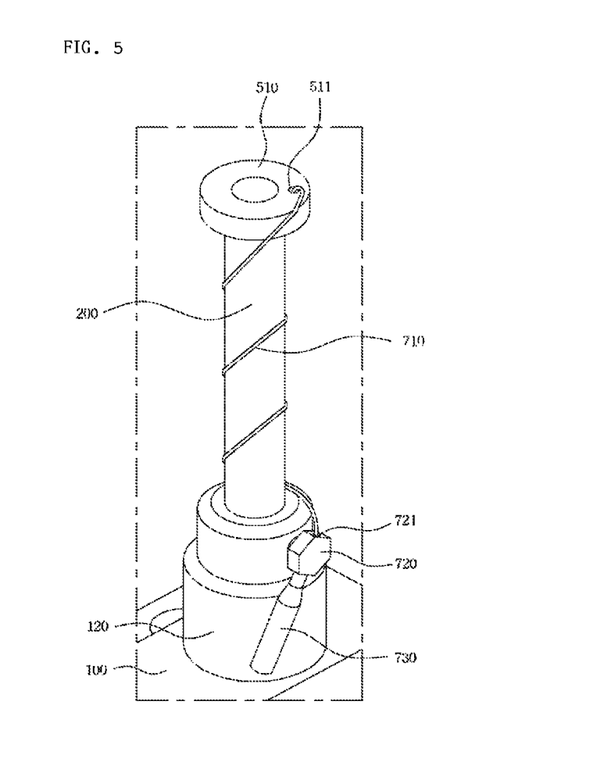
FIG. 5 is an enlarged view showing the construction of binding means shown in FIG. 2.

Meanwhile, binding means 700 for stable binding between the fixation plate 100 and the rod member 200 is installed between the fixation plate 100 and the rod member 200.

That is, the binding means 700 functions to prevent the rod member 200 from being rotated in the direction in which the rod member 200 is released due to the generation of vibration attributable to an earthquake or a typhoon when the fixation plate 100 and the rod member 200 are coupled by a screw.

The binding means 700 includes a wire 710 configured to have one end inserted into the support 510 that is disposed on one side of the rod member 200 in the length direction of the rod member 200 and spirally wound in the length direction of the rod member 200, a fastening bolt 720 configured to have a through groove 721 through which the other end of the wire 710 penetrates formed on at the side of a head of the fastening bolt 720 and inserted into the side of the coupling tool 120, and a stopper member 730 installed at the other end of the wire 710 and configured to prevent the wire 710 from being separated from the fastening bolt 720.

That is, after the wire 710 is inserted into the insertion hole 511 of the support 510, the end of the wire 710 is inserted into the through groove 721 that is formed at the head part of the fastening bolt 720. Next, the stopper member 730 is coupled to the end of the wire 710 drawn from the through groove 721 so that the wire 710 is not separated from the fastening bolt 720.

Thereafter, the fastening bolt 720 has only to be coupled to the coupling tool 120 in the direction in which the fastening bolt 720 is inserted into the coupling tool 120 in the state in which the wire 710 has been spirally wound on the rod member 200 in the length direction of the rod member 200.

Accordingly, although vibration attributable to an earthquake or a typhoon is generated, the binding means 700 can fundamentally prevent the rod member 200 from being rotated in the direction in which the rod member 200 is released from the fixation plate 100.

As described above, in accordance with the present invention, the first cap 610 of the rod cap 600 and the coupling tool 632 are configured to have a press type coupling structure in which the first cap 610 and the coupling tool 632 are coupled up and down not using a screw-mating method. Accordingly, there is an advantage in that coherence between the first cap 610 and the coupling tool 632 can be prevented from becoming weak because the first cap 610 is prevented from being separated from the coupling tool 632 although the first cap 610 is rotated by vibration factors, such as an earthquake and a typhoon.

Furthermore, the falling of a thunderbolt can be rapidly discharged because an area for inducing a lightning current of the falling of a thunderbolt is greatly increased because the rod cap 600 is formed to have a relatively larger circumferential radius than the insulator 300.

Furthermore, the rod member 200 can be fundamentally prevented from being rotated in the direction in which the rod member 200 is released from the fixation plate 100 although vibration attributable to an earthquake or a typhoon is generated because the binding means 700 for stable binding between the fixation plate 100 and the rod member 200 is included.

In accordance with the present invention, the first cap of the rod cap and the coupling tool are configured to have a press type coupling structure in which the first cap and the insulating protrusions are coupled up and down not using a screw-mating method. Accordingly, there is an advantage in that coherence between the rod cap and the coupling tool can be prevented from becoming weak because the first cap is prevented from being separated from the insulating protrusions although the first cap is rotated by vibration factors, such as an earthquake and a typhoon.

Furthermore, the falling of a thunderbolt can be rapidly discharged because an area for inducing a lightning current of the falling of a thunderbolt is greatly increased because the rod cap is formed to have a relatively larger circumferential radius than the insulator.

Furthermore, there is an advantage in that the rod member can be fundamentally prevented from being rotated in the direction in which the rod member is released although vibration attributable to an earthquake or a typhoon is generated because the binding means for stably binding the fixation plate and the rod member is included.

What is claimed is:

1. A bipolar lightning rod apparatus, comprising:
a fixation plate;
a rod member configured to have a first end connected to the fixation plate in a length direction of the rod member and charged with electric charges of a ground;
at least two insulators installed in the length direction of the rod member;
an electrification plate installed between adjacent insulators, electrically insulated from the rod member, and charged with electric charges having an opposite polarity to the electric charges of the ground;
an electrification tube installed between the electrification plate and the insulators, electrically connected to the electrification plate, and charged with electric charges having an opposite polarity to the electric charges of the ground; and
a rod cap connected to a top of the rod member and configured to induce a falling of a thunderbolt; and binding means for stable binding between the fixation plate and the rod member, wherein the rod cap is configured to have an outside diameter relatively greater than an outer diameter of the insulators so that discharge efficiency is increased by greatly increasing an area into which the falling of a thunderbolt is induced, and wherein the rod cap comprises: a first cap of a dome shape;
a second cap coupled to an outer circumference of the first cap in a radius direction of the first cap; and
a coupling member configured to couple the first cap to the rod member,
wherein the coupling member comprises a base plate configured to have a coupling hole formed therein and a first coupling tool coupled to the coupling hole of the base plate, wherein a multi-staged fitting jaw is formed in an outer circumference direction and in a length direction of the first coupling tool,
wherein a coupling plate is located between the first cap and the base plate and has fitting pieces at one end thereof, wherein the fitting pieces of the coupling plate are coupled with the multi-staged fitting jaw of the first coupling tool through a press type coupling structure and the other end of the coupling plate is fixed on the first cap wherein the fixation plate and the rod member are coupled by a second coupling tool protruded from the fixation plate, and wherein the binding means comprises a wire configured to have a first end inserted into a support that is disposed on one side of the rod member in the length direction of the rod member and spirally wound in the length direction of the rod member, a fastening bolt configured to have a through groove through which a second end of the wire penetrates formed at the side of a head of the fastening bolt and inserted into a side of the second coupling tool, and a stopper member installed at the second end of the wire and configured to prevent the wire from being separated from the fastening bolt.

* * * * *